April 21, 1953   H. M. ROBINSON   2,636,155
DOUBLE SPEED MOTOR
Filed Feb. 4, 1952
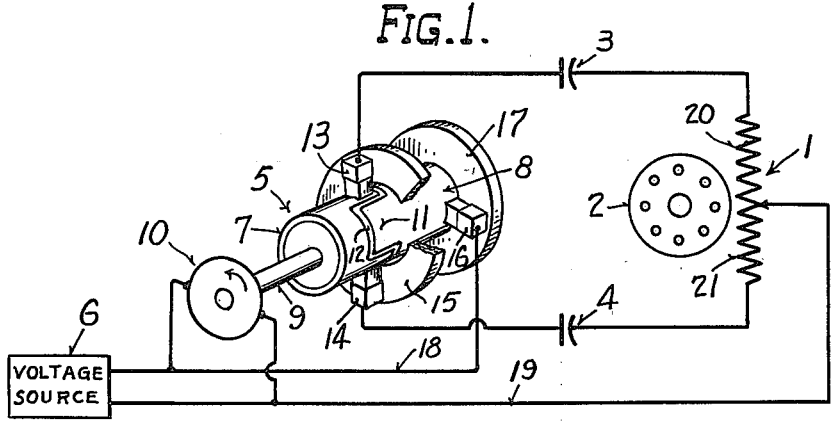
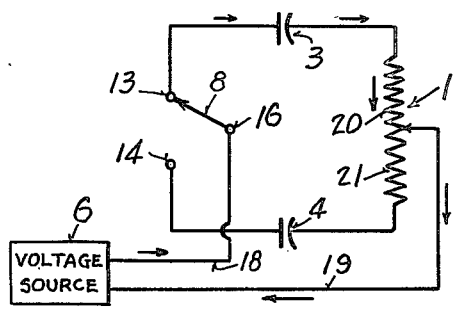
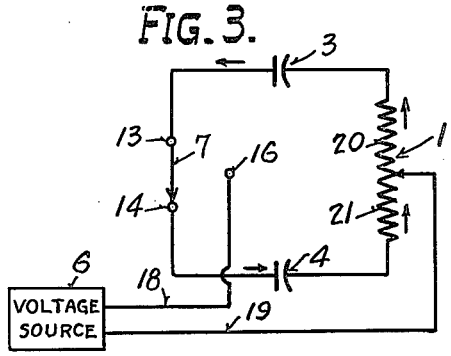
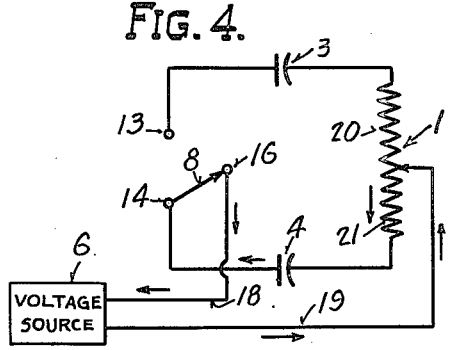
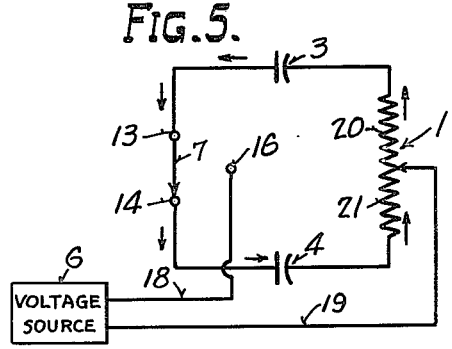
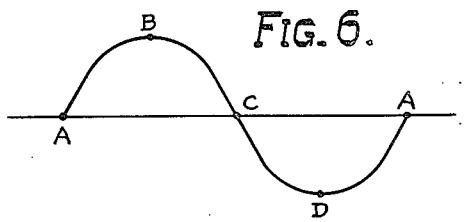
INVENTOR.
Horace M. Robinson
BY
ATTORNEYS Patented Apr. 21, 1953

2,636,155

UNITED STATES PATENT OFFICE 2,636,155

DOUBLE SPEED MOTOR

Horace Milton Robinson, Los Angeles, Calif., assignor to A. O. Smith Corporation, Milwaukee, Wis., a corporation of New York Application February 4, 1952, Serial No. 269,709

9 Claims. (Cl. 318—231)

1

This invention relates to an electric motor constructed to run at double the frequency of the source of voltage supply therefor.

An object of the invention is to provide a relatively simple and economical motor adapted to operate at twice the speed of ordinary motors when energized by a source of voltage supply such as a standard 60 cycle source, so that the power of the motor is relatively high for the size and weight thereof.

Another object of the invention is to provide a double speed motor wherein all switching operations are performed at substantially zero current to greatly increase the life of the switching apparatus.

A further object is to provide a high speed motor which may be constructed for resonance of the double frequency wave and a minimum of undesired harmonics.

The invention, in general, comprises a motor winding associated with a suitable rotor, at least one capacitor connected in circuit with the motor winding, and switching apparatus to control the relationship between the motor winding, the capacitor and a source of generally sinusoidal alternating voltage. The switching apparatus is driven in synchronism with the voltage supply wave and is provided with contact means to alternately effect charging of the capacitor through the motor winding as the supply wave rises to a peak, and shorting of the capacitor through the motor winding as the supply wave falls to zero, so that a double frequency current wave is provided in the motor winding to effect operation of the rotor at double speed.

These and other objects and advantages of the invention will be set forth more fully in the following description of the embodiment of the invention illustrated in the accompanying drawings.

In the drawings:

Figure 1 is a schematic diagram of the motor, showing an illustrative apparatus for performing the switching functions necessary to produce double speed motor operation;

Fig. 2 is a schematic wiring diagram illustrating the switching connections and resulting current paths during the interval between points A and B on the sine wave shown in Fig. 6;

Fig. 3 corresponds to Fig. 2 and shows the shorting of one capacitor, which occurs between points B and C indicated in Fig. 6;

Fig. 4 shows the current paths provided immediately after reversal of the direction of current flow in the supply lines, that is to say between points C and D in Fig. 6;

2

Fig. 5 shows the shorting of the second capacitor, which takes place between points D and A in Fig. 6; and Fig. 6 is a diagram of one full cycle of the alternating voltage wave supplied to the motor.

Referring to the drawings, the double speed motor comprises a winding 1, a squirrel cage rotor 2 operably associated with the winding 1 for rotation during energization thereof, and a pair of capacitors 3 and 4 connected, respectively, to the ends of the winding for alternate charging and discharging therethrough as will subsequently be described. A switching means 5, which is connected to the capacitors 3 and 4 and to a suitable source 6 of generally sinusoidal alternating voltage and current, serves to determine the periods of motor energization by the voltage source 6 and also the periods of shorting and discharge of the respective capacitors.

The switching means 5 may be of any suitable variety which is adapted to be operated in synchronism with the voltage wave emanating from the supply source 6. A tuned vibrating reed switch, for example, may be employed if desired.

In the switch means shown in Fig. 1, two conducting sleeves 7 and 8 are mounted in axial alignment on a shaft 9 driven by a synchronous motor 10. The inner end of the right sleeve 8 is provided with a rectangular projection or axial extension 11 adapted to nest into a corresponding and slightly larger rectangular notch or recess in the left sleeve 7, there being a layer of insulating material 12 separating the sleeves both adjacent the projection 11 and between the remaining portions of the inner sleeve ends. The extension 11 is approximately 90 degrees in width, that is to say about one-quarter of the circumference of the sleeves.

In carrying out the construction of the switch means 5, two brushes 13 and 14 are mounted diametrically opposite each other on a stationary brush holding ring 15 disposed circumferentially of the right sleeve 8. The brushes 13 and 14 are connected, respectively, to the capacitors 3 and 4 and are disposed to alternately engage the notched inner end portion of the left sleeve 7 or the axial extension 11 of the right sleeve 8, depending upon the rotated positions of the sleeves. A third brush 16, which is mounted on a second and corresponding stationary brush holding ring 17, engages the main body portion of the right sleeve 8 at all times. The brush 16 is connected to a first power line 18 leading to the voltage source 6, whereas the second power line 19 leading to the voltage source is connected to the center of the motor winding 1 to divide the same into two segments 20 and 21.

The operation of the double speed motor is as follows: Assume that the source 6 is producing a 60 cycle sine wave of voltage as shown in Fig. 6, and that the synchronous motor 10 is synchronized with the sine wave, for example by being connected for energization thereby as illustrated. The motor 10, and sleeves 7 and 8 driven by motor 10, thus make one complete revolution during each full cycle of the voltage wave, one full cycle being shown in Fig. 6. Further assume that the motor 10 is rotating in a counterclockwise direction, and that the diametrically opposite brushes 13 and 14 are adjusted so that the upper brush 13 commences to engage the axial sleeve extension 11 at the instant when the source voltage is at point A in Fig. 6.

When brush 13 commences to engage extension 11, a circuit is completed, as represented in Fig. 2, from the voltage source 6 through line 18, brush 16, sleeve 8, extension 11 of sleeve 8, brush 13, capacitor 3, segment 20 of winding 1, and power line 19 back to the voltage source 6. This circuit is maintained during a quarter revolution of the sleeves 7 and 8 until brush 13 is disengaged from extension 11, that is to say, due to the synchronism between the motor 10 and the voltage source, until point B in Fig. 6 is reached. The capacitor 3 is thus charged through the motor winding segment 20 by a current which rises to a peak and then diminishes to zero at point B as the result of the diminishing rate of change of voltage as point B is approached.

When extension 11 of sleeve 8 rotates counterclockwise out of engagement with brush 13 at point B indicated in Fig. 6, a shorting circuit (Fig. 3) is completed by reengagement of brush 13 with sleeve 7. This circuit may be traced from capacitor 3 through brush 13, sleeve 7, brush 14, capacitor 4, and motor winding 1 back to capacitor 3. The current caused by discharge of capacitor 3 through the above traced shorting circuit flows through motor winding segment 20 in the opposite direction from the current flowing therethrough during charging of the capacitor 3, and rises to a peak and diminishes to zero in a length of time dependent upon the circuit parameters. According to the invention, the parameters of the shorting circuit are selected so that the capacitor discharge current reaches zero at approximately the same time that the voltage source wave reaches point C in Fig. 6.

By the time point C is reached, motor 10 and sleeves 7 and 8 will have turned counterclockwise another quarter revolution to cause the sleeve extension 11 to engage brush 14, so that the shorting circuit of Fig. 3 is broken and a charging circuit for the second capacitor 4 is completed as shown in Fig. 4. This circuit is traceable from voltage source 6 through line 18, brush 16, sleeve 8, projection 11 of sleeve 8, brush 14, capacitor 4, winding segment 21, and line 19 to source 6. The current flowing through this circuit rises to a peak and then falls to zero at point D in Fig. 6, to effect charging of capacitor 4 similarly to the charging of capacitor 3 in accordance with Fig. 2. The charging of capacitor 4, however, is in the reverse direction since the current flowing from voltage and current source 6 through lines 18 and 19 reverses after point C is reached.

At point D in Fig. 6, sleeve projection 11 rotates away from brush 14 to break the charging circuit, and sleeve 7 engages brush 14 to complete a shorting circuit (Fig. 5) from capacitor 4 through motor winding 1, capacitor 3, brush 13, sleeve 7, and brush 14 to capacitor 4. The charge on capacitor 4 then causes current to flow in the reverse direction, relative to the charging current of Fig. 4, through segment 21 of motor winding 1.

Similarly in the case of the capacitor discharge current described in connection with Fig. 3, the circuit parameters are selected so that the current effected by discharge of capacitor 4 rises to a peak and then falls to zero at point A indicated in Fig. 6. At point A, the extension 11 again engages brush 13 for recommencement of the operating cycle described above.

During the described operating cycle, the alternate charging and discharging of the respective capacitors 3 and 4 effects reversal of the direction of current flow in at least one segment of motor winding 1 twice for each reversal of the direction of current flow in lines 18 and 19 leading to voltage source 6. Thus, since the source 6 is assumed to be a 60 cycle source, a 120 cycle current wave is passed through winding 1 to effect double speed rotation of the rotor 2 associated therewith. In a two pole motor, for example, the rotor 2 will operate at 7200 R. P. M. instead of the usual 3600 R. P. M.

It is an important feature of the invention that all switching operations, that is to say shifting of a brush 13 or 14 from engagement with one sleeve to engagement with the other, are performed when the current passing through the brushes is zero. This zero current switching, with resulting minimized arcing and greatly increased life of the switching apparatus 5, is accomplished through synchronism of the switching apparatus with the source voltage and through proper selection of the sizes of the capacitors, motor winding, and other circuit parameters.

The circuit parameters are also selected, insofar as is possible for the desired operating conditions, so that resonance is attained at the 120 cycle wave. Accordingly, the number and intensity of harmonics are maintained at a minimum and the torque characteristics of the motor are greatly improved.

In actual operation of the described motor, the reversal of the current wave in winding 1 may not occur precisely at the points A, B, C and D indicated on the wave of Fig. 6. This is because the resistance and inductance present in the circuit may shift the phase of the current wave a certain amount. In spite of this, however, zero current switching operations may be attained by merely shifting the brushes 13 and 14 a corresponding amount.

The motor of the invention is particularly adapted for use on portable grinders and other portable tools where high power is desired and motor size and weight must be maintained at a minimum.

Various embodiments of the invention may be employed within the scope of the accompanying claims.

I claim:

1. In an electric motor adapted to be energized by a source of voltage, a rotor, a motor winding operatively associated with said rotor to effect rotation thereof, a capacitor, and switch means to control the electrical relationship between said motor winding, capacitor, and source of voltage, said switch means being driven in a manner to alternately effect completion of a charging circuit comprising said source of voltage, capacitor, and a motor winding for charging of said capacitor by current flowing through said motor winding and to effect breaking of said charging circuit and completion of a shorting circuit comprising said capacitor and motor winding for discharge of said capacitor and consequent flow of current through said motor winding in a direction opposite to the direction of current flow therethrough during charging of said capacitor.

2. In an electric motor adapted to be connected to source of voltage having a given frequency, a motor winding, a capacitor, a charging circuit comprising said motor winding, capacitor, and source of voltage, a shorting circuit comprising said motor winding and capacitor, switch means to complete said charging circuit for charging of said capacitor through said motor winding and then to break said charging circuit and complete said shorting circuit for discharging of said capacitor through said motor winding, and means to drive said switch means at a speed effecting both said charging and discharging of said capacitor during the time required for the voltage wave emanating from said source of voltage to pass through one half-cycle of values.

3. In a double speed electric motor adapted to be connected to a source of alternating voltage having a given frequency, a rotor, a motor winding operatively associated with said rotor to effect rotation thereof, a capacitor, electric circuit means connecting said motor winding and capacitor in a charging circuit with said source of voltage and connecting said motor winding and capacitor in a shorting circuit independent of said source of voltage, and motor driven switch means to effect alternate closing of said charging and shorting circuits for alternate charging of said capacitor through said motor winding and discharging of said capacitor therethrough, said switch means being synchronized with the alternating voltage wave emanating from said source of voltage in a predetermined manner effecting both charging and discharging of said capacitor during the time required for said voltage wave to pass through a half-cycle of values and effecting switching operations during intervals when the current flowing through said switch means is substantially zero.

4. A double speed electric motor, comprising a motor winding, a capacitor, and switch means to first connect said motor winding and capacitor in circuit with a source of sinusoidal alternating voltage for charging of said capacitor through said motor winding and thereafter to connect said capacitor and motor winding in circuit with each other independently of said source of voltage for discharging of said capacitor through said motor winding, said switch means being driven in predetermined synchronism with the sinusoidal wave generated in said source of voltage to effect both charging and discharging of said capacitor during passing of said voltage wave through a half-cycle of values and to effect commencement of the discharging of said capacitor when said voltage wave is approximately at a peak value.

5. A double speed electric motor adapted to be connected to a source of sinusoidal alternating voltage having a given frequency, which comprises a motor winding, a capacitor, a charging circuit comprising said motor winding, capacitor, and source of voltage, a shorting circuit comprising said motor winding and capacitor, switch means to alternately close said charging circuit for charging of said capacitor through said motor winding and then open said charging circuit and close said shorting circuit for discharging of said capacitor through said motor winding, and means to operate said switch means in a manner to effect closing of said charging circuit when the voltage from said source is approximately at zero, to effect opening of said charging circuit and closing of said shorting circuit after said voltage has risen to approximately a peak, and to effect opening of said shorting circuit after said voltage has fallen to approximately zero, the parameters of said shorting circuit being such that the discharge current from said capacitor rises to a peak and falls to zero during substantially the same length of time that said shorting circuit is closed, whereby the opening and closing of said charging and shorting circuits occurs at substantially zero current conditions for maximum life of said switch means.

6. A high speed electric motor adapted to be connected to a source of alternating current having a given frequency, which comprises capacitor means, a motor winding, electric circuit means interconnecting said motor winding, capacitor means, and source of current, and switch means operative to control said circuit means and driven in synchronism with the frequency of the current generated in said source, said switch means serving when said current from said source is flowing in a given direction to effect charging of at least a portion of said capacitor means through at least a portion of said motor winding and thereafter to effect shorting of the charged capacitor means through said motor winding, and when said current from said source is flowing in the reverse direction to effect charging of at least a portion of said capacitor means through at least a portion of said motor winding and thereafter to effect shorting of the charged capacitor means through said motor winding, whereby a current wave having twice the frequency of the current wave from said source is passed through said motor winding for double speed operation of the motor.

7. A high speed electric motor adapted to be connected to a source of sinusoidal alternating current having a given frequency, which comprises a rotor, a motor winding associated with said rotor and formed in two segments, capacitor means, electric circuit means interconnecting said source of current, said motor winding, and said capacitor means, and switch means to control said circuit means, said switch means serving when current from said source is flowing in a given direction to effect charging of at least a portion of said capacitor means through one of said motor winding segments and thereafter to effect shorting of the charged capacitor means through both of said motor winding segments, and when said current from said source is flowing in the reverse direction to effect charging of at least a portion of said capacitor means through the other of said motor winding segments and thereafter to effect shorting of the charged capacitor means through both of said motor winding segments, whereby a current wave having twice the frequency of the current wave from said source is passed through said motor winding for high speed operation of said rotor.

8. A high speed electric motor adapted to be connected to a source of sinusoidal alternating voltage, comprising a motor winding, first and second capacitors connected, respectively, to the ends of said motor winding, a first power line tapped to substantially the center of said motor winding and connected to said source of voltage, a second power line connected to said source of voltage, a switch connected to said second power line and to both of said capacitors on the opposite sides thereof from the connections leading to said motor winding, and means to drive said switch in synchronism with the voltage wave from said voltage source and to cause said switch to connect said first capacitor with said second power line, then to disconnect said first capacitor from said second power line and connect said capacitors in circuit with each other, then to disconnect said capacitors from each other and connect said second capacitor to said second power line, and thereafter to disconnect said second capacitor from said second power line and again connect said capacitors in circuit with each other, all of said switching connections and disconnections being performed at substantially zero current in said switch and at substantially equal intervals during one full cycle of said voltage wave.

9. A high speed electric motor adapted to be connected to a source of sinusoidal alternating voltage, comprising a motor winding, first and second capacitors connected, respectively, to the ends of said motor winding, a first power line tapped to substantially the center of said motor winding and connected to said source of voltage, a second power line connected to said source of voltage, a rotary switch comprising two mutually insulated conducting portions and three brushes connected, respectively, to said second power line and to said capacitors on the opposite sides thereof from the connections leading to said motor winding, and a synchronous motor connected across said power lines and operatively connected to said conducting portions to drive the same in synchronism with the voltage wave from said voltage source, said brushes and conducting portions being constructed and adjusted to first connect said first capacitor with said second power line, to then disconnect said first capacitor from said second power line and connect said capacitors together, to then disconnect said capacitors from each other and connect said second capacitor to said second power line, and thereafter to disconnect said second capacitor from said second power line and again connect said capacitors together, all of said switching connections and disconnections being performed at substantially zero current in said switch and at substantially equal time intervals each forming one quarter-cycle of said voltage wave.

HORACE MILTON ROBINSON.

No references cited.